United States Patent [19]

Pritchard et al.

[11] Patent Number: 5,157,484
[45] Date of Patent: Oct. 20, 1992

[54] SINGLE CAMERA AUTOSTEROSCOPIC IMAGING SYSTEM

[75] Inventors: Eric K. Pritchard, Berkeley Springs, W. Va.; Christopher A. Mayhew, McLean, Va.

[73] Assignee: Vision III Imaging, Inc., Vienna, Va.

[21] Appl. No.: 619,512

[22] Filed: Nov. 29, 1990

Related U.S. Application Data

[63] Continuation-in-part of Ser. No. 425,232, Oct. 23, 1989, Pat. No. 5,014,126.
[52] U.S. Cl. ..................................... 358/91
[58] Field of Search .............. 358/88, 89, 91, 92, 358/3; 350/130, 131, 144; 352/62

[56] References Cited

U.S. PATENT DOCUMENTS

| | | |
|---|---|---|
| 1,950,473 | 3/1934 | Brand . |
| 2,002,090 | 5/1935 | Ives . |
| 2,158,660 | 5/1939 | Kanolt . |
| 2,303,742 | 12/1942 | Howells . |
| 2,356,441 | 8/1944 | Bickley . |
| 2,508,487 | 5/1950 | Bonnet . |
| 2,933,008 | 4/1960 | Barneth . |
| 3,494,270 | 2/1970 | Shibata ..................... 354/115 |
| 3,608,457 | 9/1971 | Barker . |
| 4,006,291 | 2/1977 | Imsand . |
| 4,062,045 | 12/1977 | Iwane . |
| 4,303,316 | 12/1981 | McElveen . |
| 4,420,230 | 12/1983 | McElveen . |
| 4,429,328 | 1/1984 | Jones, Jr. et al. . |
| 4,528,587 | 7/1985 | Jones, Jr. . |
| 4,714,319 | 12/1987 | Zeevi et al. . |
| 4,815,819 | 3/1989 | Mayhew et al. . |
| 4,966,436 | 10/1990 | Mayhew et al. . |

FOREIGN PATENT DOCUMENTS

| | | |
|---|---|---|
| 57-37993 | 3/1982 | Japan Watanake . |
| 0107247 | 4/1989 | Japan ..................................... 358/88 |
| 2135470A | 1/1984 | United Kingdom . |

OTHER PUBLICATIONS

"Vision III Single-Camera Autostereoscopic Methods", by Christopher A. Mayhew, SMPTE Journal, Jun. 1991.

Primary Examiner—Victor R. Kostak
Attorney, Agent, or Firm—Barnes & Thornburg

[57] ABSTRACT

A single camera autostereoscopic recording system includes a single image recorder having a single optical path moved along the scanning path substantially continuously for a plurality of scanning cycles. A path defining structure includes the ability to adjust the convergent point as well as the extent of travel along the scanning path or disparity of the images. The convergent point of the scanning path can be manually or automatically adjusted using a range finder. A unique driver structure provides scanning motion with reduced reactional forces. The degree of motion of the recorded images is used to adjust the amount of travel along the scanning path. Synchronization between the driver and the recorder is bi-directional for double exposures. The recorded image is adjusted in recording or in display as a function of the position in the scanning path.

25 Claims, 10 Drawing Sheets

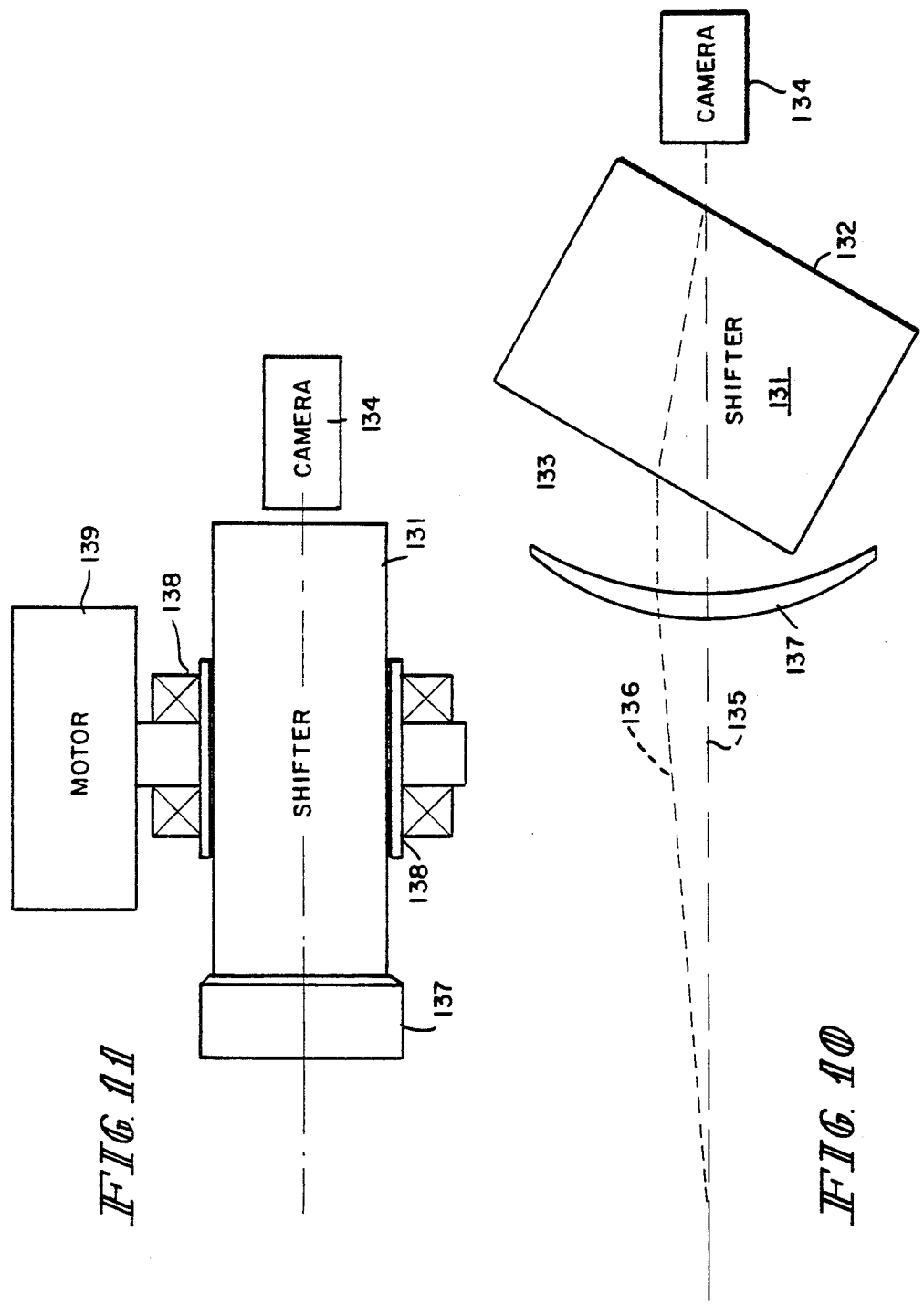

SINGLE CAMERA AUTOSTEROSCOPIC IMAGING SYSTEM

CROSS-REFERENCE

This is a continuation-in-part of U.S. patent application Ser. No. 425,232 filed Oct. 23, 1989.

BACKGROUND AND SUMMARY OF THE INVENTION

This invention relates to stereoscopic imaging systems for creating a three-dimensional illusion using motion pictures or video recorders. It is more closely related to autostereoscopic systems, which produce true three-dimensional images which do not require glasses or parallax barriers to create a three-dimensional illusion.

Humans perceive movement in motion pictures and television because of the brain mechanisms underlying such established psychological facts as persistence of vision and the phiphenomenon. Depth is perceived by the interpretation of disparity information from the eyes through a process called stereopsis. What stereopsis is and how it is performed are still a matter of some debate.

Humans have binocular (stereoscopic) vision-two eyes that look in the same direction and whose visual fields overlap. The eyes are horizontally aligned and separated by an interocular distance averaging about 65 mm. Each eye views the scene from a slightly different angle. The scene viewed is focused by the eye's lens onto the retina as a two-dimensional image. The two-dimensional images from each eye are transmitted along the optic nerves to the brain's visual cortex. The monocular and parallax depth information from the eyes is compared and interpreted through stereopsis, to form a true three-dimensional view.

A distinction must be made between monocular depth cues and parallax information in the visual information received. Both eyes provide essentially the same monocular depth cues, but each provides different parallax depth information, a difference that is essential to produce a true three-dimensional view.

It is possible to perceive depth to a certain extent in a two-dimensional image. Monocular depth is perceived when viewing a still photograph, a painting, or standard television and movies, or when looking at a scene with one eye closed. It is perceived without the benefit of binocular parallax depth information. Such depth relations are interpreted by the brain from monocular depth cues such as relative size, overlapping, perspective, and shading Even though human eyes are horizontally aligned, the brain will process parallax information from any direction. It has been reported that vertical parallax information when displayed at a rate of 4 to 30 Hz, produces a sense of depth that is superior to that produced by horizontal parallax presented in the same manner.

It has also been reported that the fusion range of stereoscopic vision is within a 40 minutes (0.66°) angle for horizontal disparity and up to a 7 minutes (0.1166°) angle for vertical disparity.

Parallax information does not have to be presented to the brain simultaneously. The left and right eye depth information can be presented alternately to the left and right eyes, resulting in depth perception as long as the time interval does not exceed 100 milliseconds. The brain can extract parallax information from a three-dimensional scene even when the eyes are alternately covered and uncovered for periods of up to 100 milliseconds each. The brain can also accept and process parallax information presented to both eyes if sequenced properly. The ideal view cycle sequencing rate is between 3-6 Hz.

True three-dimensional image displays can be divided into two main categories, stereoscopic or binocular and autostereoscopic. Stereoscopic techniques (including stereoscopes, polarization, anaglyphic, Pulfrich, and shuttering technologies) require the viewer to wear a viewing apparatus. Autostereoscopic techniques (such as holography, lenticular screens, parallax barriers, alternating pairs, and parallax scans) produce images with a true three-dimensional illusion without the use of glasses.

Prior art three-dimensional television or motion picture display system, that did not require viewing glasses, alternately displayed views of a scene recorded by two cameras at their respective points of view. U.S. Pat. No. 4,006,291 to Imsand, U.S. Pat. Nos. 4,303,316 and 4,420,230 to McElveen, and U.S. Pat. No. 4,429,328 to Jones, et al describe methods using horizontally, vertically and a combination of horizontally and vertically displaced views. The images produced using the method of Jones, et al did appear three-dimensional, but were extremely unstable and possessed a distracting rocking motion. Jones, in U.S. Pat. No. 4,528,587, attempted to control the rocking motion by using a video mixing device, which intermittently superimposed the second camera's image onto that of the first, rather than alternating images as before. This mixing technique did little to control rocking and resulted in intermittent image softening.

The applicants have experimented with the known alternating-camera methods and concluded that stable three-dimensional images could not be achieved simply by aligning two cameras vertically, horizontally or diagonally and switching between or mixing them at a 4 to 5 Hz view cycle rate. Commercial production standards today are much too high for the image instability and/or softening inherent in these methods.

Unlike stereoscopic techniques, which provide each eye with a different image, alternating techniques provide the same image to both eyes. With a stereoscopic system the brain will compensate for some mismatch of camera lenses, color and luminance differences, and differences in parallax angles. In alternating systems the slightest mismatch is readily perceived.

Image instability (rocking) is caused by a variety of factors. The main cause is the presentation of alternating points of view that differ in parallax and are not in tune to be perceived as depth rather than motion. Since all prior art alternating techniques use two cameras, factors such as improper alignment of cameras, lenses mismatched in focal length and/or focus, chrominance and luminance mismatches, poor quality optics, s- and p- polarization differences, and misplaced convergent point all contribute to image instability. Another problem is the methods used to obtain the parallax information. Provisions must be made for constant parallax and convergent corrections during shooting in order to keep the depth information in tune with the human brain.

Image instability can be rendered less noticeable by the use of masking techniques. Camera motion is very effective in hiding rocking, apparently because the brain places less importance on the rocking motion than on the camera motion. This result could represent some sort of natural stabilizing phenomenon or mechanism of the brain that helps us see clearly when we walk or run, when the images would otherwise bounce.

Proper camera convergence and parallax angle adjustment are also very important. Our tests have shown that if the convergent point is set on the closest object to the camera or closer and the parallax angles are in tune with the scene being shot, the brain tends to disregard background motion, if it is combined with camera motion. If the convergent point is set behind the closest object, that object will rock and the rocking cannot be masked by camera motion or parallax tuning. If the camera moves, the closest object moves, or something enters the frame closer than the convergent point, the convergent point must be pulled back and the parallax angle adjusted (tuned) accordingly. The reverse is also true, if the closet object moves farther away from the camera, the parallax angle should also be adjusted.

The methods and camera system described in U.S. Pat. Nos. 4,815,819 and 4,966,436 to Mayhew and Pritchard require careful camera alignment to eliminate unwanted movement in all depth planes. Precision matching of chrominance and luminance between cameras, and a good deal of operator skill to manipulate disparity, convergence, and time-displacement rates required to maintain a stable image.

Even though this two camera system can deliver a very stable, broadcast-quality video image, it is not ideal for day to day television production. The cameras require constant alignment adjustment. Because of the folded optical path, lenses with a view wider than that of a 32 mm lens can not be used, and zoom lenses are not practical. The fact that the system uses a special mount to hold two cameras and a folded optical path makes it large and heavy.

For all of the reasons above and others the autostereoscopic methods using a single camera are the subject of the applicants U.S. patent application Ser. No. 425,232 filed Oct. 23, 1989, now U.S. Pat. No. 5,014,126 were developed. The methods described in said U.S. patent application do not suffer from any of the matching, alignment, and lens limitations of the prior art. Other single camera systems have been suggested and some even developed for three-dimensional imaging, but all use two lenses or some type of beamsplitter to provide two differing parallax views. The disclosures of all of the applicants aforesaid issued or pending U.S. Patents are included herein by specific reference.

Most prior art shuttering stereoscopic and autostereoscopic motion picture and television techniques use square wave switching methods to alternate between the two points of view, or origin. The abrupt shift in parallax in square wave switching contributes to image instability.

The present application approach is to give each frame its own parallax scan. Each frame and its scan preferably will fall on one or the other side of the nominal optical axis of the camera, which is the point of zero amplitude of the sine wave. The camera imaging plane's optical axis sweeps across the nominal and through positions having parallax.

A parallax scan is different from the prior art point of view or origin. A typical point of view has the same angle of parallax at the start and end of a particular frame's exposure. The angle in radians is determined by the disparity of the point of origin (distance from the nominal) divided by the distance to the point of convergence (for angle in degrees multiply by 57.2958). One point is on one side of the nominal and one the other. Each point may have several frames exposed from it, or as few as one field in video.

Parallax scanning techniques employ a continuously moving imaging plane. A particular frame will start its exposure at one angle of parallax and end it at another angle of parallax, which is greater or less than the starting angle depending on where the frame lies in the scan. A parallax scan can sweep back and forth across the nominal zero point in any direction-horizontal, diagonal or vertical. The scanning motion blurs the background of the frame slightly and therefore helps mask unwanted rocking. The optical axis of the parallax scan is centered on the point of convergence. A parallax scan can achieve a very large angle of parallax in its extreme exposure frame and a high overall average angle of parallax. Because the differences are slight, a sine wave can also be approximated by a parabolic sequence.

It is an object of this invention to provide a recording system for producing the scanning motion which produces the time-shared imagery.

Another object of this invention is to provide a system for moving the scanning components without introducing reaction forces (vibration) in the recorder and its supporting members.

Still another object of this invention is to provide inexpensive scanning techniques suitable for less demanding situations.

An even further object of this invention is to provide a disparity control system which is locked to the camera frames or fields.

A still further object of this invention is to provide a disparity control responsive to the scene velocity.

Another object of this invention is to provide automatic adjustment of the scanning convergent point.

These and other objects are achieved by providing an autostereoscopic image recorder having a single recorder for recording images and including a single optical path through a convergent point between the scene and the recorder, a scanning path structure and a driver for substantially continuously moving the single optical path along a scanning path for a plurality of scanning cycles. The path defining structure may include a rail transverse to the optical path and a second rail displaced from the optical path at an angle to the first rail. The recorder is mounted to move on the rails. The convergent point of the system may be adjusted by moving the recorder and the rail system relative to each other. This may be achieved by moving the rail structure along the optical path or changing the angle of the second or convergent rail. A path defining structure may define a linear path orthogonal to the optical path and include a lens which converges the optical path on the convergent point. Alternatively, the path defining structure may define an arc which is centered about a fixed point in the optical point and the lens for causing the optical path to intersect the second fixed point. The convergent point is one of the first or second fixed points. In either system, the convergent point may be adjusted by changing the distance between the lens and the recorder or the first fixed point.

The driving device which produces vibration-free scanning motion includes a support to which a first and second mass are movably mounted. The recorder is connected to the first mass. A drive for the masses substantially continuously moves the first and second masses in opposite directions such that the recorder moves along the scanning path for a plurality of scanning cycles. The second mass has substantially the same mass as the first mass plus the mass of the recorder. The drive for the masses includes an armature and a stator mounted to the first and second masses. The first and second masses are mounted to the support by a pulley structure to produce the equal and opposite motion.

The convergent point may be adjusted automatically by a device which determines the distance between the recorder and a desired convergent point thereby adjusting the scanning path to maintain the optical path on the desired convergent point during scanning.

The extent or amplitude of the scanning path is adjusted depending upon the degree of motion in the scene or of the apparatus. Because of observed masking techniques, the amount of travel is increased for the degree of motion. The amount of motion is determined by correlation between successive recorded images.

The driver structure is synchronized to the recorder operation. The synchronization controls the drivers for bi-directional operation of the recorders such that double exposure can be produced while maintaining the three-dimensional effect.

In addition to the parallax effect produced by recording a plurality of scanning images during a cycle, additional external stimuli is provided. The position of the recorder along the scanning path is determined and the ultimate image is adjusted. The image may be adjusted within the recording frame or during the display of the recording frame.

Other objects, advantages and novel features of the present invention will become apparent from the following detailed description of the invention when considered in conjunction with the accompanying drawings.

BRIEF DESCRIPTION OF THE DRAWINGS

FIG. 10 is a schematic view of an autostereoscopic camera using a cylindrical lens for convergence and an oscillating cube for disparity according to the principles of the present invention;

FIG. 11 is a top view of the system shown in FIG. 10;

DETAILED DESCRIPTION OF THE DRAWINGS

The preferred embodiment for professional film and television use provides the greatest versatility in disparity (the extent of the scan) and convergence (focus or hub of the scan); both are continuously variable.

This embodiment shows a film camera, however the technique is equally applicable to television and other motion imaging techniques. Further, this embodiment shows vertical scanning however the technique can be applied to horizontal scanning or a combination of vertical and horizontal scanning by simply rotating the scanning mechanism. Still further the linear techniques maybe converted to rotary to produce a circular or elliptical scanning.

Figure 1:
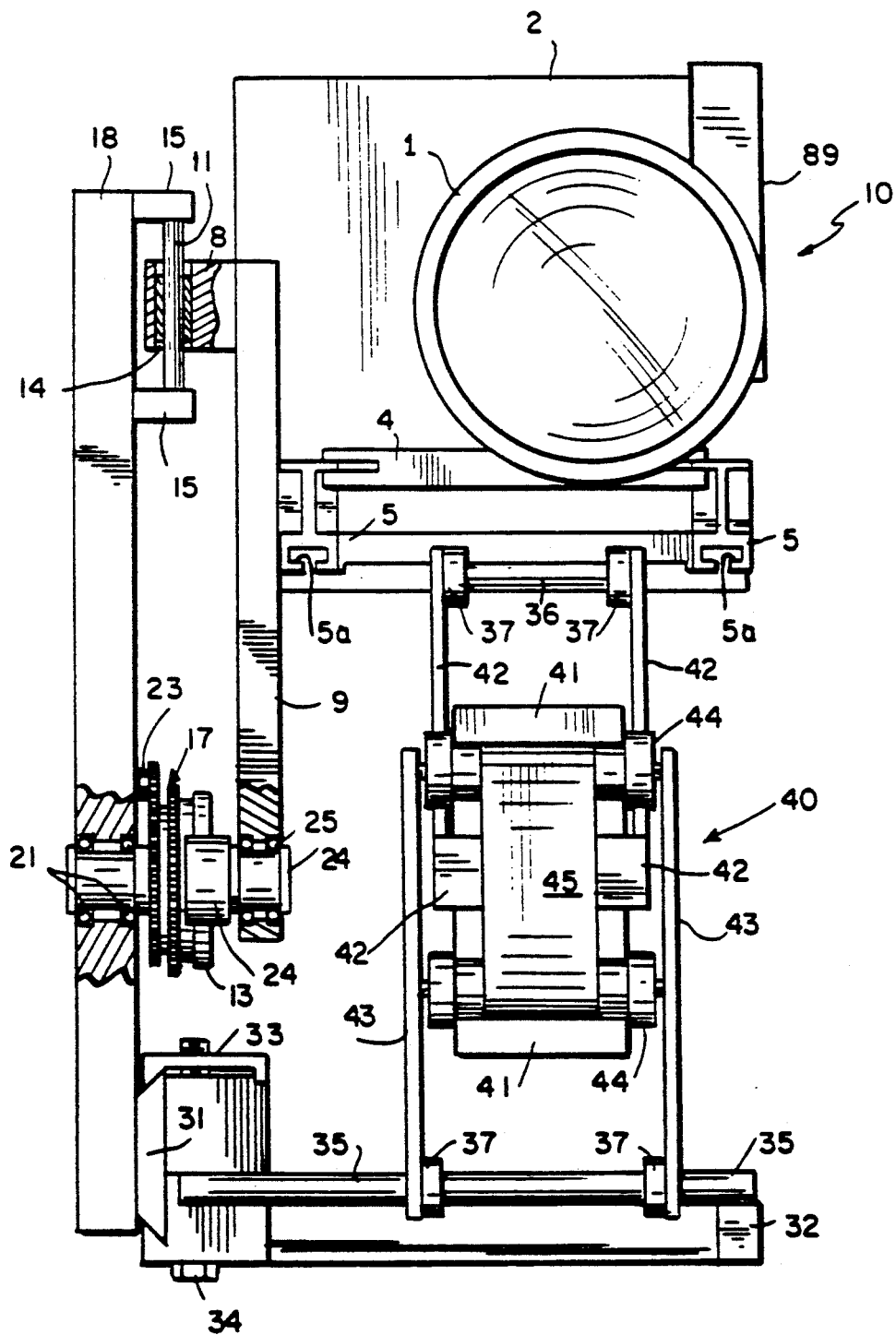
FIG. 1 is the front view of an autostereoscopic camera incorporating the principles of the present invention.
Figure 2:
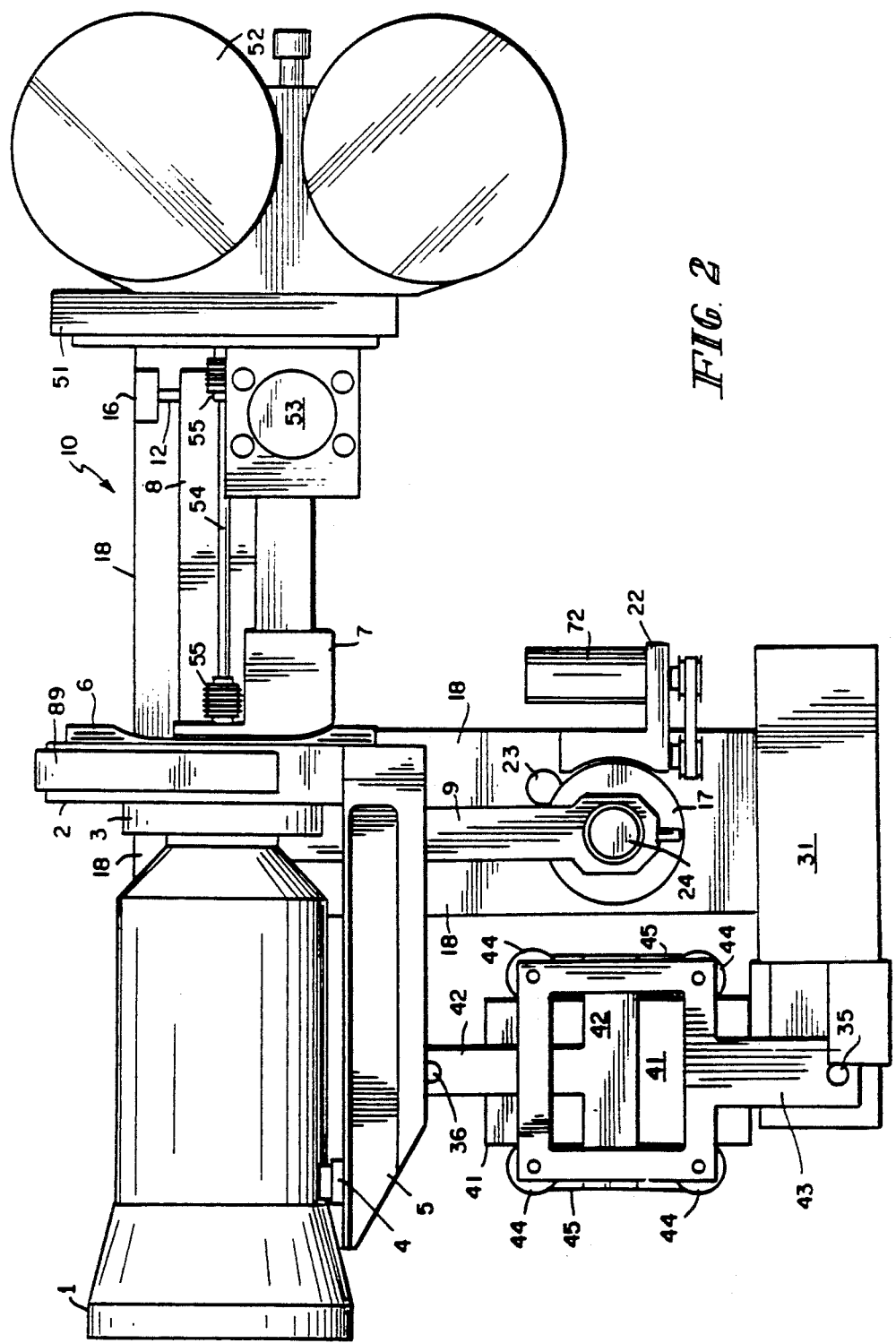
FIG. 2 is the side view of an autostereoscopic camera of FIG. 1.
Figure 3:
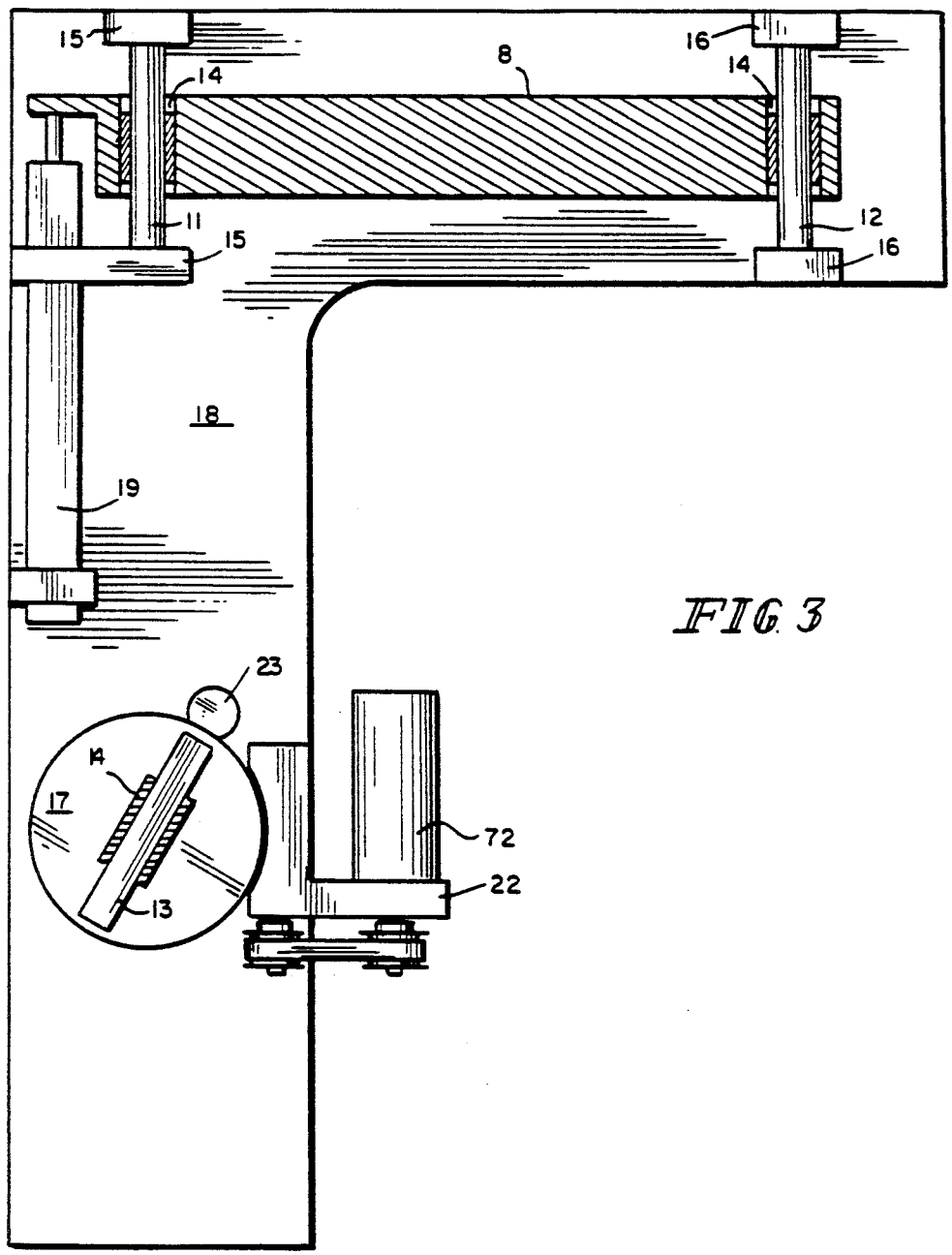
FIG. 3 is the side view of an autostereoscopic camera with its components removed to expose the convergent rail system.

The preferred embodiment is depicted in FIGS. 1, 2 and 3 in front and side views respectively. The lens 1 is connected to the camera front 2 by the lens mount 3 and by the lens support 4 and 5. The camera front 2 supports the aperture plate 6 and movement 7. The remaining solid connections to the camera front 2 are the yaw arm 8 and the convergent arm 9. Elements 1-9 constitute a camera front assembly 10.

The camera front assembly 10 moves on front rail 11, rear rail 12, and convergent rail 13 with aid of linear bearings such as 14 shown in detail in FIG. 3. The linear bearing 14 for rails 11 and 12 are preferably Thompson Industries super ball bushings which allow for angular misalignment of 0.009 inch per inch or 9 milliradians of rotation. This is more than acceptable since the maximum demanded for autostereoscopic imaging is 2 milliradians.

The rails 11, 12, and 13 are supported by blocks 15 and 16 and by convergent gear 17 respectively. Components 15-17 are supported by the camera frame 18. The camera frame 18 also supports the rear of the camera and is fastened to a pan and tilt support system (not shown) which supports the camera system from the side.

The convergent gear 17 is rotatably mounted to camera front 18 by bearings 21 and driven by motor and gear assembly 22. The position of the convergent gear 17 or angle of convergent rail 13 is transmitted to a servo positioning system by feedback sensor 73 of FIG. 5 by gear 23. The position of the camera front assembly 10 is sensed by sensor 19, which was omitted from FIGS. 1 and 2 for clarity, and used in the control circuit of FIG. 7.

A linear bearing assembly 24 which includes bearing 14 connects the convergent rail 13 to and rotates in the convergent arm 9 on bearings 25. The convergent rail 13 is moved out of line with rail 11 to make the camera front move in an approximate arc about a convergent point in front of the camera.

The scanning motor assembly and camera front assembly 10 are supported by cross arm 31 which is connected to the bottom of camera frame 18. Support arm 32 is clamped to cross arm 31 with a clamp 33 and bolt 34. Support rail 35 is bolted to support arm 32 while rail 36 is bolted to lens support 5 via T-nuts, not shown, in the T-nut slots 5a in lens support 5. Collars 37 locate the scanning or disparity motor 40 left and right on rails 35 and 36. The scanning motor 40 may be moved forward and rearward via the support arm assembly 32-35 and the rail 36 in conjunction with the aforementioned T-nuts in lens supports 5. This is one form of adjustment of the convergent point about which the system scans.

The scanning motor 40 must be positioned so that its center of gravity is in line with the center of gravity of the camera front assembly 10 wherein said line is the direction of the scan. This is one of the necessary conditions for a perfectly counterbalanced system, i.e. a system which does not vibrate the camera or the camera mount.

Figure 6:
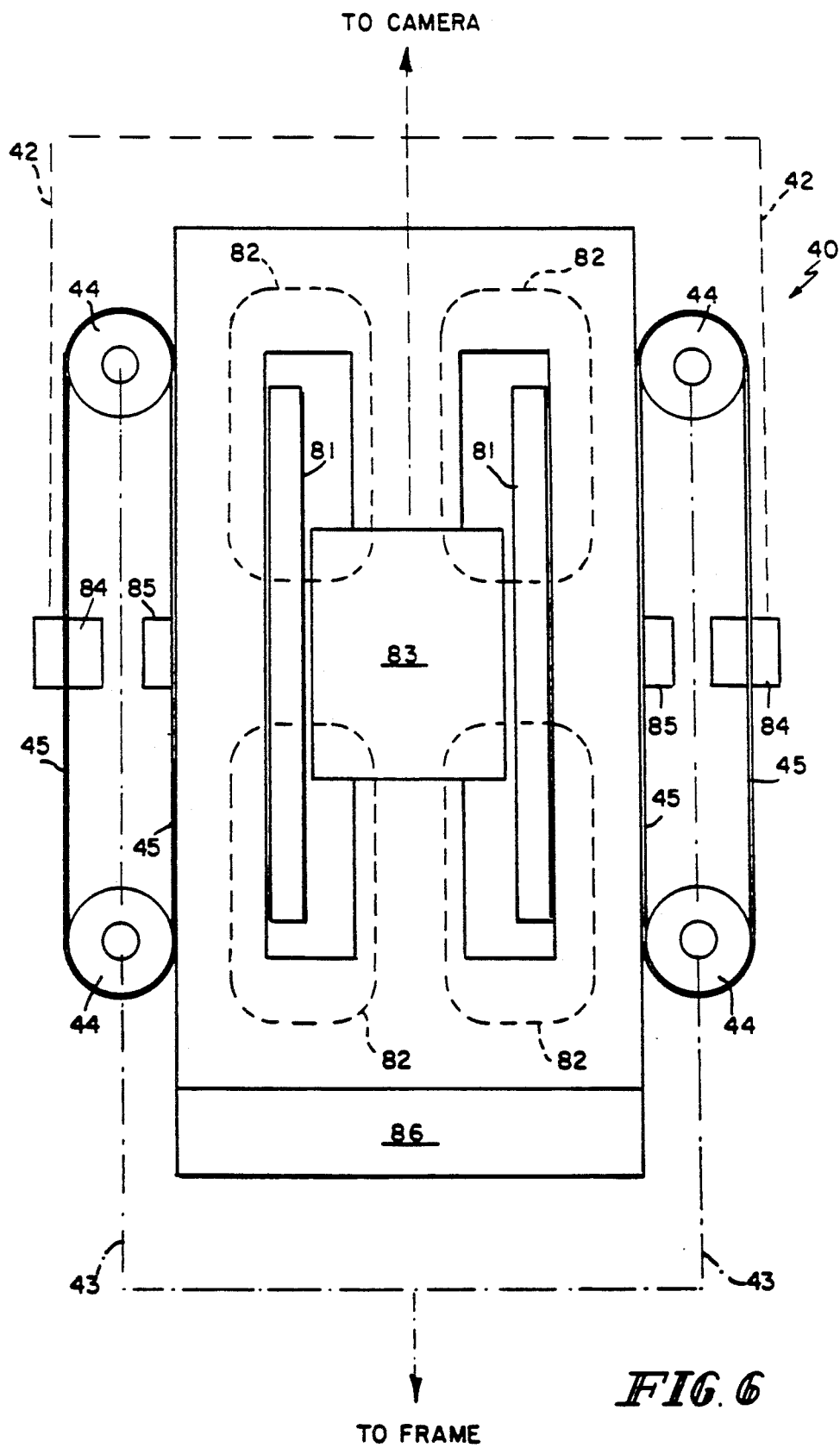
FIG. 6 is a side view of a counterbalanced linear motor for disparity drive which eliminates vibrations according to the principles of the present invention.

Briefly, the scanning motor 40 consists of stator 41, armature 42, frame 43, rollers 44, and belts 45. The stator 41 is a permanent magnet structure which provides reaction mass and the magnetic field to work armature 42. The belts 45 are stretched over pairs of rollers 44. The belts 45 are also fastened to the armature 42 and stator 41 so that the armature 42 and stator 41 move in opposite directions with respect to frame 43. The specific attachment is shown in FIG. 6.

The total weight of the camera front assembly 10, the stator 41 and armature 42 are supported by the rollers 44, motor frame 43, rail 35, etc.

A counterbalanced vibration free system requires that the stator 41 balances armature 42 and camera front assembly 10 and rail 36. Since the pulley belt system moves the stator 41 and armature 42 equally, the stator 41 must weigh the same as the components 1-9, 36, 37, and 42. If the stator 41 and armature 42 move unequally, then the weights must be different.

The camera rear 51 is supported by camera frame 18. The camera rear 51 accepts the film magazine 52 and mounts a film drive motor, not shown. This film drive motor drives the sprocket 53 and drive shaft 54 via couplings 55. These couplings are preferably the bellows variety to transmit power to the movement 7 and shutter, not shown, while allowing for the varying angle and distance between the camera front 2 and camera rear 51.

The sides, top, and bottom of the camera can not be solid, but are a bellows and are used in a manner similar to the bellows in a view camera It is important to isolate the motion from the front of the camera to the rear because the rear components are heavy and the film moves in the magazine 52, thereby changing the weight distribution.

Figure 4:
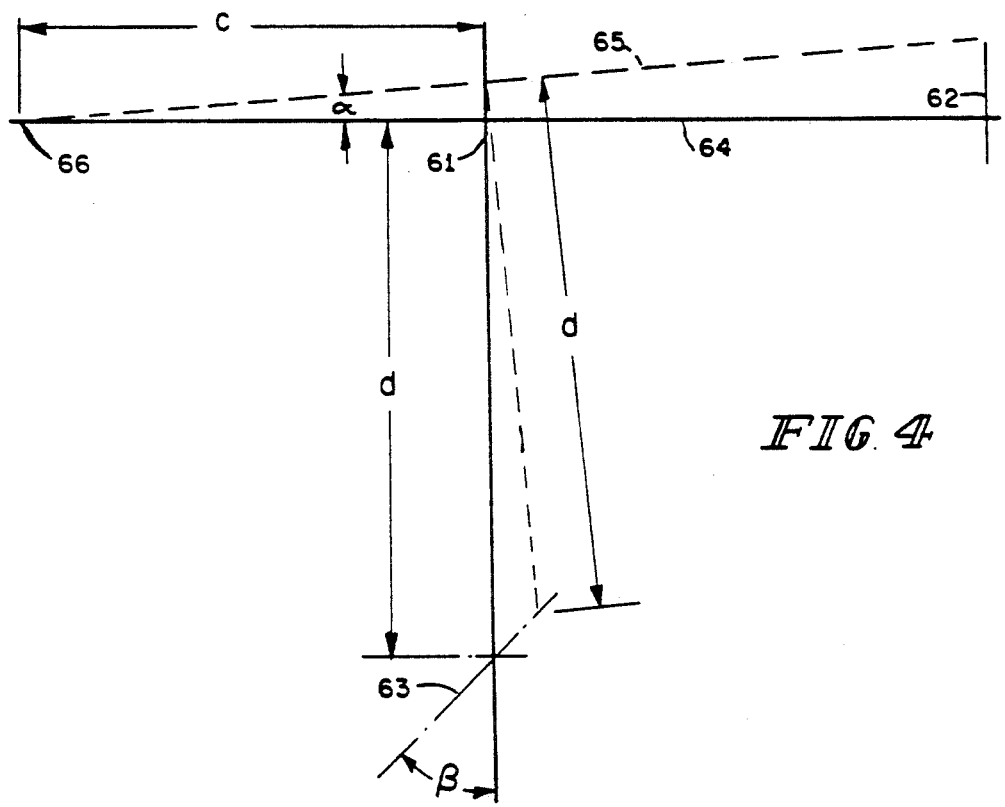
FIG. 4 is a schematic of the convergent motion.

FIG. 4 is a schematic diagram of the convergent motion. Lines 61, 62, and 63 represent the axis of rails 11, 12, and 13 respectively. Line 64 is the nominal optical path while Line 65 is an off nominal optical path separated by angle $\alpha$ at the at the convergent point 66. The convergent rail 63 is at an angle $\beta$ with respect to front rail 61. The distance c is the distance to the convergent point while d is the distance from the nominal optical axis 64 to the center of rotation of the convergent rail 13 and gear 17.

The relationship between the distance c and the angle $\beta$ is approximately:

$$c = d \cot \beta$$

This relationship is accurate so long as $\alpha$ is small. Fortunately, the limit for good autostereoscopic imaging is 2 milliradians, a small angle.

The kinematic arts contain other examples of arc approximating mechanisms. This one is preferred because of its light weight and rigidity. However the motion of the camera about a convergent point 66 may be accomplished in a number of ways.

Note that a video camera system may either move the entire camera or may use a video camera split into two parts which are joined by a cable, such as a Sony BVP-7T umbilical video camera. With such a video camera, only the video head and lens need be manipulated in a scanning path as previously described.

Figure 5:
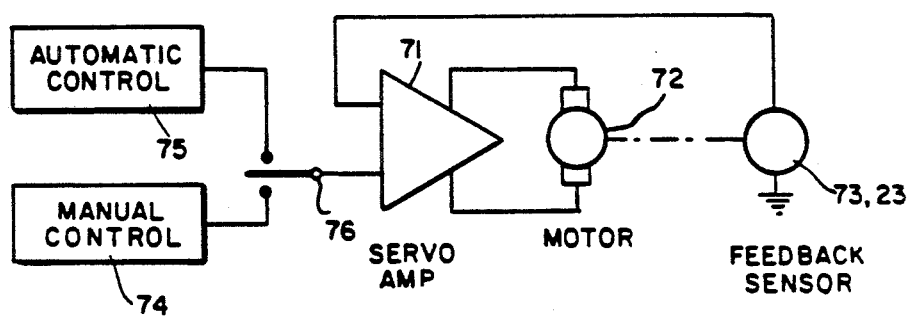
FIG. 5 is a block diagram of a convergent point control system according to the principles of the present invention.

FIG. 5 is the convergent point control system which consist of servo amplifier 71, motor 72, feedback sensor 73, and input command sources 74 and 75. The motor 72 is in the motor assembly 22. The sensor 73 is driven by gear 23. The amplifier 71 drives the motor 72 to make the feedback sensor 73 output match the command. The command may be input by manual control 74 or by automatic control 75 as selected by a switch 76. The automatic control 75 would include the ability to measure the distance to the desired convergent point 66.

The convergent distance is usually less than or equal to the distance to the closest object to the camera imaging plane. The convergent distance is measured by a sensor and converted by the following relationship:

$$\beta = \cot^{-1}(Fc/d)$$

where F is a distance fraction to put the convergent point between the camera and the closest object.

FIG. 6 is an enlarged diagram of the counterbalanced vibration free linear scanning motor 40 which also appears in FIGS. 1 and 2. The stator 41 is a magnetic structure which includes permanent magnets 81 which produce magnetic flux paths 82. Current in coil 83 of the armature 42 interacts with the flux to produce a force up or down the page. The force on the stator 41 is the same magnitude as the force on the coil 83.

The stator permanent magnet force accelerates the stator 41 and the coil force accelerates the coil armature 42 and the camera front assembly 10. If there were no other forces or requirements no further considerations need be made. However, the force of gravity must be considered. The simplest way of dealing with gravity and generally keeping everything together is to use rollers 44 and belts 45 to couple the stator 41 and the armature 42. Clamps 84 lock the belt 45 to the armature 42 while clamps 85 lock the belt 45 to the stator 41. This puts the gravitational forces through the pulleys 44 and into the support 43 then on to the camera frame 18.

The pulleys force the acceleration of the stator 41 to be equal but opposite to armature 42 and camera front assembly 10. These components must have the same mass so that equal but opposite magnetic forces will produce equal but opposite forces. Otherwise the pulley and belts will equalize the forces by passing the forces to the next available mass; the camera frame 18; an undesirable situation.

Extra mass 86 may be required on the stator 41 if the camera front assembly 10 and armature 42, weighs more than the stator 41. Otherwise, weight has to be added to the camera front assembly 10.

Figure 7:
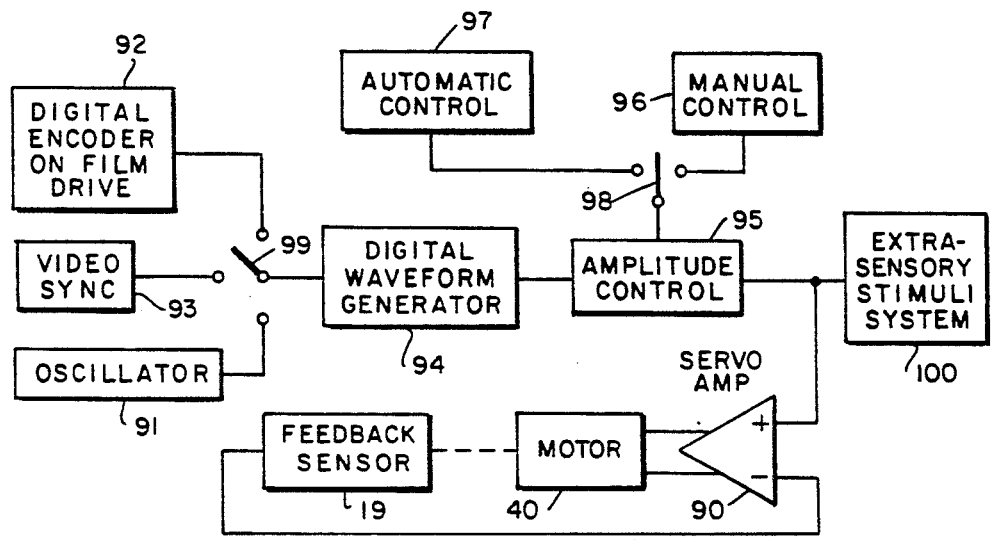
FIG. 7 is a block diagram of a control system for the disparity motor of FIG. 6.

FIG. 7 is the disparity control assembly system which drives the scanning motor 40 of FIG. 6 and moves the camera front assembly 10 along the approximate arc established by rails 11–13. Feedback sensor 19 produces a feedback signal indicative of this motion and servo amplifier 90 drives the motor 40 so that the feedback signal nearly matches the command signal from the amplitude control 95.

There are two facets to this control signal, its frequency and its amplitude. Both are controlled. The frequency of the control system must be such that when the images acquired by the camera are displayed the disparity motion frequency will be in the range acceptable to the brain. If this where the only consideration, the frequency source could be a suitable oscillator 91. However, the disparity operation may need to maintain some phase relationship with the camera system. Film systems use an encoder 92 which produces pulses in response to shutter rotation so that the disparity drive is slaved to the film. The preferred encoder system is bidirectional so that the disparity (scan path) backs up when film is rewound. This permits for double exposures. Similarly, the sync pulses 93 from video systems synchronize the disparity operations. The appropriate synchronization source is selected by switch 99.

The selected frequency signal drives the digital waveform generator 94. This generator includes a frequency divider which can be preset to determine the number of camera frames or images recorded per disparity or scanning cycle. Preferably this counter is bidirectional to work best with film applications. This counter then drives a second counter, also preferably bidirectional for film applications.

The output of this second counter is used to produce the output waveform. Although the usual techniques of a read-only-memory driven digital-to-analog converter may be used, a twin-converter circuit producing parabolic waveforms is preferred.

The twin converter techniques uses the first converter to produce a value proportional to the counter value. This value is accepted as a reference by the second converter. The $1-x$ output produces the desired parabolic $x-x^2$. This is made sinusoidal like by alternating the reference to the first converter between plus and minus. The parabola produces slightly greater disparities for the same signal limits.

The waveform then passes through the amplitude control 95 on its way to the servo amplifier 90. The amplitude may be controlled by manual control 96 or via the automatic controller 97 as selected by switch 98. The automatic controller would include measurement of camera and scene velocity.

Excessive disparity amplitude is perceived as rocking in the image. However, the extent of the rocking in the image is controlled by the velocities in the image. As discussed previously, some motion in the scene will mask other motions. For example, horizontal motion of the image will mask or allow greater vertical motion or disparity. Thus the amount, amplitude or extent of the disparity or length of the scanning path can be increased for increased scene motion. These velocities are created by pan, tilt, trucking of the camera, zooming of the lens, or subject movement or movement of other objects in the scene. One approach is to simply measure the camera motion and create an amplitude control therefrom. To account for scene motion as well as camera motion, correlation of the recorded images is preferred.

The preferred automatic system acquires video images from a video camera, either as the primary camera or as a secondary camera in a video tap 89 as shown in FIGS. 1 and 2. The video signal is digitized and stored in memory for a computer correlation with a prior frame. The location of best correlation is indicative of the velocity of the scene. If the best correlation with a prior frame requires a significant location change, then the scene is moving significantly. A small change in location is indicative of small scene velocities. The location changes are then smoothed, scaled, and used to control the amplitude.

Figure 8:
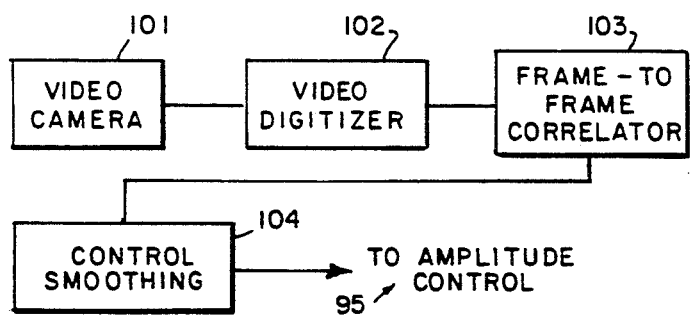
FIG. 8 is a block diagram of a scene velocity measurement system for the automatic controller of FIG. 7 according to the principles of the present invention.

This subsystem is shown in FIG. 8. The video camera 101 creates an output which is digitized by digitizer 102. The digitized image is correlated with a prior image by correlator 103. The resulting control value is then smoothed by smoothing control 104 and used to control the amplitude 95.

The use of automatic controls for these camera functions simplifies the cameraperson's job by making the system user friendly.

The single camera autostereoscopic and similar techniques do not directly indicate where the view is. This is inferred by the background motion. The view is up if the background is down, and vice versa. However, in abstract situations where the background is not so readily recognizable or not even present, this inference is difficult or impossible. The operation of the single camera system is similar to the human vision and image processing of the brain when walking. Walking causes a cyclic change in height of the eyes, a parallax scan. However, the brain also knows the position of the eyes in the walking parallax scan.

It is the function of the extra-sensory stimuli system 100 to provide the extra stimuli to the brain to provide the parallax scan position directly using the disparity amplitude control signal from amplitude control 195 as the scan position. Alternatively, the extra-sensory stimuli system 100 could use the signal from feedback sensor 19.

The preferred embodiment uses the scan position signal to offset the position of the image on a television monitor. The offset is down when the camera is looking down, up when up, left when left, etc. The position of the eyes then conveys the position of the scan to the brain. For movie projectors, the shift can be accomplished by moving the film gate or the lens in a similar manner.

Figure 12:
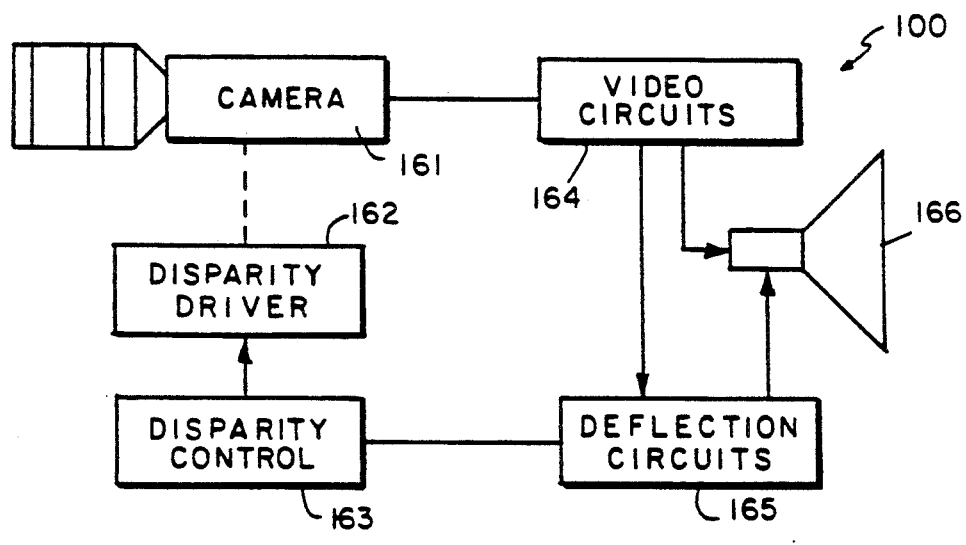
FIG. 12 is a block diagram of a video system with display disparity according to the principles of the present invention.

The preferred embodiment of the extra-sensory stimulus system 100 is shown in FIG. 12. The video camera 161 is driven in a parallax scan by disparity driver 162. The disparity driver is controlled by 163 which is described herein above and shown in FIG. 7. The camera drives video circuits 164. The video circuits send sync signals to the deflection circuits 165. The video circuits 164 also control the intensity of the image on cathode ray tube 166. The deflection circuits control the deflection of the electron beam as it travels from the cathode to the face of 166.

The signal from the disparity control 163 to the deflection circuits 165 moves the image on 166 in response to the parallax scan generated by 163. This is done by adding vertical parallax scan to the vertical deflection amplifier of 165 and horizontal parallax scan, if used, to the horizontal deflection amplifier of 165.

Other concepts for the extra-sensory stimuli system 100 include a very large disparity driver for moving the viewer, and an audible signal whose frequency is controlled by the disparity driver. However, these techniques are more expensive and require viewer education respectively.

The above described system is quite extensive, large and potentially delicate. The complexities of continuous convergent point control may be avoided if the convergent point is fixed. Although the convergent rail 13 could be set at a fixed angle, a cylindrical lens may also be employed as in FIG. 9 and the convergent rail 13 eliminated. The camera 121 moves across the curvature of the lens 122 by counterbalanced motor 40.

The nominal dashed optical axis 124 travels through lens 122 without bending. However the dot-dashed displaced optical axis 125 from displaced camera 126 is bent. Since the camera moves parallel to the nominal optical axis 124, the displaced optical axis 125 crosses (converges) 124 at the focal point of the lens.

The cylindrical lens 122 may be changed to alter convergence. These lenses may be mounted in a turret for more convenience or a varying focal length cylindrical lens system may be employed.

The above discussions for disparity control apply to this system as well, although the waveform generator 94 may be reduced to a simple sine wave oscillator in a very simple system.

Figure 9:
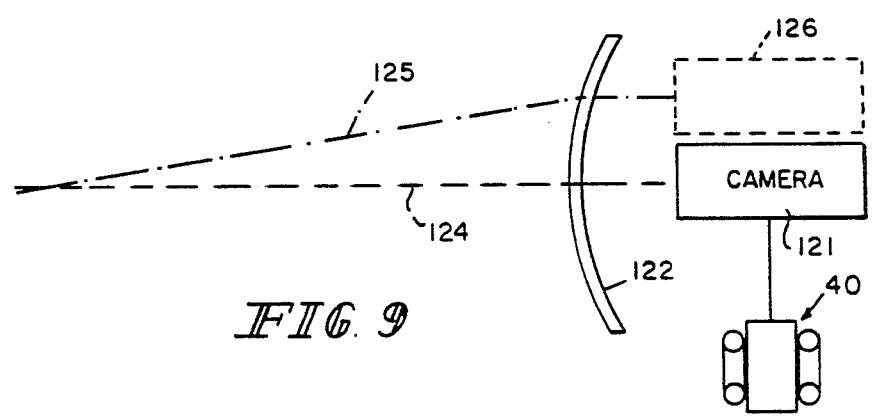
FIG. 9 is a schematic view of an autostereoscopic camera system using a cylindrical lens to provide convergence according to the principles of the present invention.
Figure 9A:
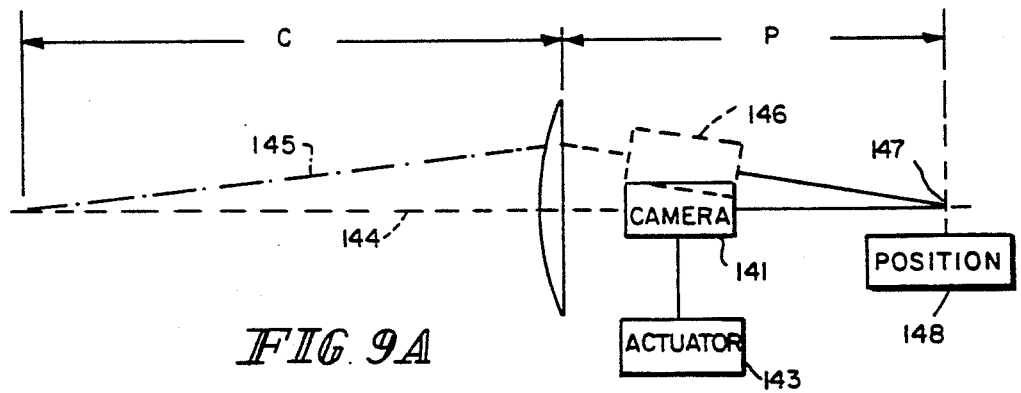
FIG. 9A is a schematic view of an autostereoscopic camera using a cylindrical lens with adjustable convergence according to the principles of the present invention.

FIG. 9A is a generalization of FIG. 9. It follows further the similarity of the parallax scan to lens behavior. Instead of the camera system moving from a nominal position 121 to a parallax position 126 linearly as in FIG. 9, the camera system moves from a nominal position 141 to a parallax position 146 in an arc by rotary disparity actuator 143. Unlike the camera 126 to lens 122 segment of optical path 125 which is parallel to nominal path 124, the similar segment of 145 is angled towards rotation point 147.

The lens relationship is used to determine the convergent point:

$$1/c = 1/f - 1/p$$

where f is the focal length of lens 142.

A positioner 148 moves the point 147 along the axis 144 with respect to lens 142. This system readily moves the convergence from infinity to a few times the focal length of lens 142. Closer convergence requires significant movement by positioner 148. Alternatively, the positioner 148 could move the lens 142 to vary the relationship between c and p.

The rotary disparity actuator 143 is similar in function to the scanning motor 40 and preferably reactionless. If the pivot 147 is on the other side of lens 142 then it has a negative focal length.

The above discussions for disparity control apply to this system as well.

Positioner 148 is similar to the system in FIG. 5, with the exception that the relationship is:

$$\frac{Fc}{c-f}$$

The use of linear camera motions can also be avoided by another system which rotates a glass optical path shifter back and forth. As shown in FIGS. 10 and 11. The optical path shifter 131 has two polished surfaces 132 and 133.

When shifter 131 is not rotated the camera 134 axis is the nominal 135. However when the shifter 131 is rotated as shown, the axis 136 is offset by shifter 131 and deflected by the cylindrical lens 137. The shifter 131 can also be rotated on multiple axes to create differing directions of parallax i.e. horizontal, diagonal, vertical, circular or elliptical.

FIG. 11 shows a top view for FIG. 10 and includes bearings 138 for the shifter 131 to rotate in. Disparity motor 139 can readily be made non-reactive by using a type DC motor with a commutation system which accounts for both armature and stator positions.

Again, the disparity control system is as described above. The optically best camera system uses a minimum of optical components as shown in FIGS. 1 and 2. Less expensive and less capable systems may be created using optical components to bend the light paths. There are many possible optical solutions to the problem of manipulating the light path to provide a scan of parallax views. For example the optical shifter 131 and cylindrical lens 137 of FIGS. 10 and 11 may be combined into a single element by simply making the parallel surfaces curved as a lens.

Figure 13:
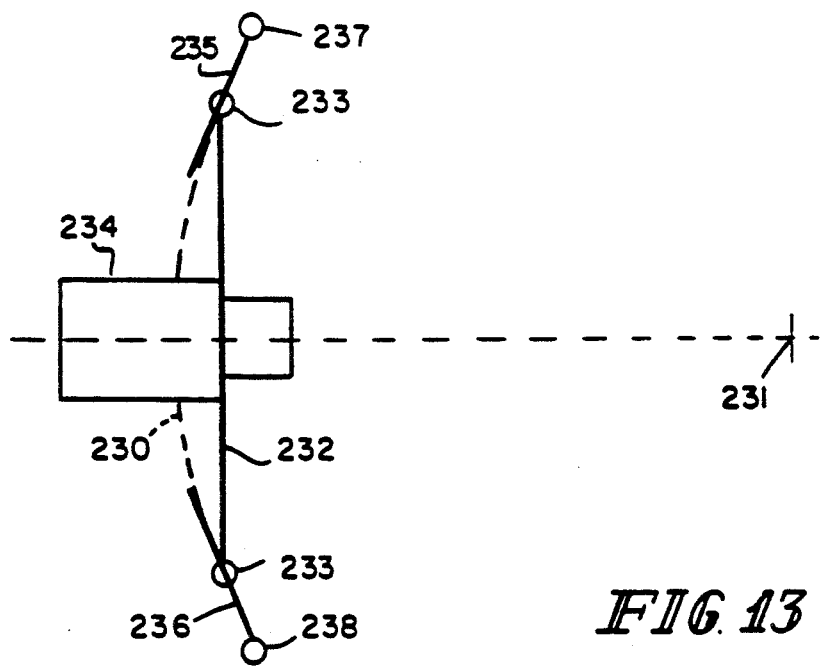
FIG. 13 is a schematic view of a two convergent rail system according to the principles of the present invention.

FIG. 13 shows another rail system scanning apparatus for moving an image receiver 234 relative to a scene. Dashed curve 230 is the scanning arc about convergent point 231. Heavy line 232 represents a mounting plate which moves along arc 230 via bearings 233 and supports image receiver 234. This assembly is driven by a motor (not shown) to provide approximate sinusoidal motion. Travelling along a single arc reduces the usefulness to a single convergent distance. The rails 235 and 236 are designed tangent to the desired arc at bearings 233. Furthermore, these rails can be pivoted about shafts 237 and 238 by positioners, previously described for convergent rail 13, to approximate a wide range of arcs which center on convergent points at varying distances from the image receiver. Thus, as long as the motion is small, the image receiver 234 will travel in an approximate arc about convergent point 231. This approximation is quite good since the angles are small, about one milliradian.

Figure 14:
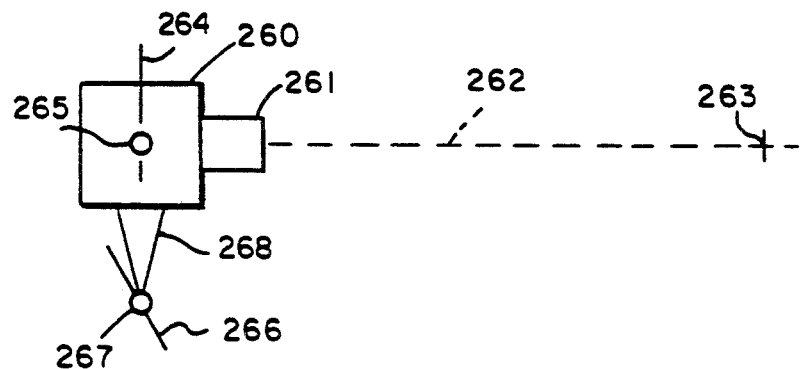
FIG. 14 is a schematic view of a variation of the embodiment of FIGS. 1-4.

Another rail system is illustrated in FIG. 14. An image receiver or camera 260 includes a lens 261 and an optical path 62 which passes through the convergent point 263. The image receiver 260 moves on fixed rail 264 with bearing 265 and moves on the rotatable rail 266 with bearing 267 and connecting linkage 268. A pair of parallel rails 264 may be provided for stability. The image receiver 260 is moved along the rails and to producing scanning motion about the convergent point 263 as approximated by rail 264. The angle of the image receiver 260 is changed by the camera pivoting about the bearing 265 as forced by the rail 266, bearing 267, linkage 268 and the scanning motion. This is a modification of the rail system of FIG. 4 in that the pair of parallel rails 64 in FIG. 14 are not displaced along the optical path as parallel rails 11 and 12 in FIGS. 1-4.

The approximation that the different positions along the arch are equidistant from the convergent point 263 holds for small changes in the angle in the optical axis 262 which is preferable one milliradiant. At one milliradiant, the distant between the image receiver 260 and the ideal convergent point 63 changes 0.5 parts per million (ppm) and the ideal convergent point moves 0.5 ppm. These errors are much smaller than the best media resolution of 100 ppm and much smaller than the resolution of television which is approximately 5,000 ppm.

The angle of rail 266 may be adjusted to change the position of the convergent point 263 and define a new scanning path having views equally distant from the convergent point as is rail 13.

Figure 15:
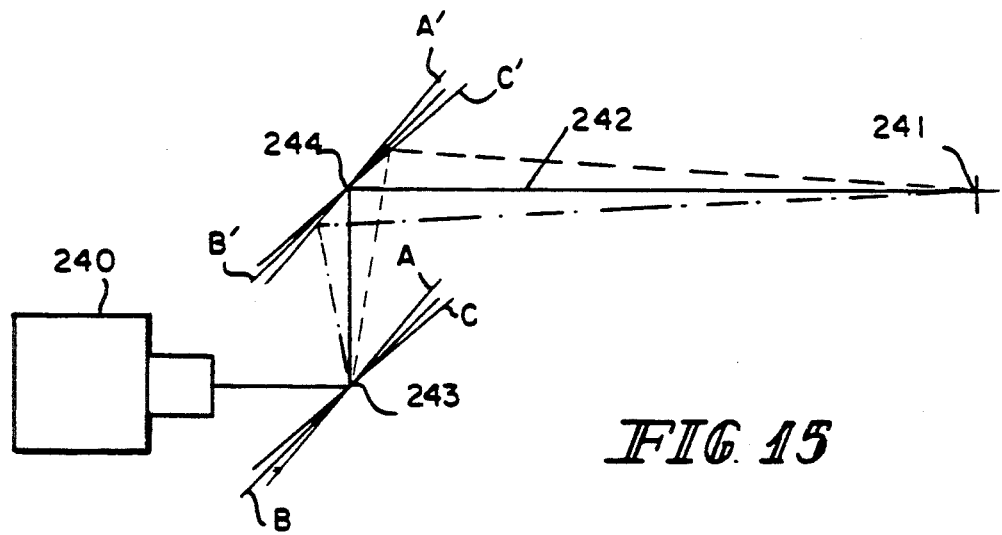
FIG. 15 is a schematic view of an optical system using a pair of optical guides.

FIG. 15 shows scanning apparatus which performs optical path manipulation for a fixed image receiver 240. Optical path manipulation may be accomplished by reflection or refraction. Image receiver 240 is aimed at convergent point 241 via nominal optical path 242 obtained with the mirrors 243 and 244 in positions B and B'. The scanning is accomplished by rotating the mirrors cyclically between extreme positions A, A', C and C'. The mirrors are rotated so that the resulting optical paths always go through the convergent point 241. Functionally, mirror 243 produces the required scan while mirror 244 corrects for the resulting optical path angle to maintain the length of the optical path between the image receiver 240 and the convergent point 241 substantially fix and aim the optical path at the convergent point 241.

Similarly, there are many different mechanical and electronic solutions to the autostereoscopic scanning problem. Although all the embodiments have been mechanical and optical, the same effect and results can be achieved or simulated by computer generated images simulating the recorder systems described herein. Software programs capable of such simulation which manipulate hierarchy and control camera movement include SCULPT IVD from Byte by Byte and TURBOSILVER from Impulse.

The recorder as used herein is to mean that portion of a recorder which includes its optics and the sensor at the imaging plane. In a film camera, the imaging plane is at the film. Thus the images are recorded at the imaging plane. For electronic video cameras, a sensor, for example a CCD chip or the equivalent, is at the imaging plane with the recording of the image being remote. In this application, the optics and the sensor are the portions being moved with the remote recording being stationary as is the magazine in FIGS. 1-3.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An autostereoscopic image recorded comprising:
a single recording means for recording images and having a single optical path through a convergent point between a scene and said recording means;
a first rail transverse to said optical path and a second rail displaced from said optical path and at an angle to said first rail to define with said first rail at least one arcuate scanning path;
means for mounting said recording means to said rails whereby said optical path transverses said at least one arcuate scanning path centered at said convergent point and defined by said first and second rails; and
driving means for substantially continuously moving said recording means along said scanning path for a plurality of scanning cycles.

2. An autostereoscopic image recorder according to claim 1 including adjustment means for adjusting said convergent point.

3. An autostereoscopic image recorder according to claim 2 wherein said adjustment means moves said recording means and said path means relative to each other to adjust said convergent point.

4. An autostereoscopic image recorder according to claim 2 wherein said adjustment means includes a carriage to which are mounted said rails and said carriage is adjustably mounted to a support to adjust said convergent point.

5. An autostereoscopic image recorder according to claim 2 wherein said adjustment means rotates said second rail to adjust said convergent point.

6. An autostereoscopic image recorder according to claim 1 including yieldable bushings connecting said recording means to said rails to allow said recording means to rotate with respect to said rails.

7. An autostereoscopic image recorder according to claim 1 including a third rail parallel to and spaced along said optical path from said first rail.

8. A stereoscopic image recorder according to claim 1 including a third rail spaced along said optical path from said first rail.

9. An autostereoscopic image recorder comprising:
a single recording means for recording images and including a single optical path through a convergent point between a scene and said recording means;
path means for defining a scanning path transverse to said optical path;
a lens in said optical path to cause said optical path to converge on said convergent point during motion of said recording means; and
driving means for substantially continuously moving said recording means along said scanning path for a plurality of scanning cycles.

10. An autostereoscopic image recorder according to claim 9 wherein said path means defines a linear path orthogonal to said optical path.

11. An autostereoscopic image recorder according to claim 9 wherein said path means defines an arc centered about a first fixed point in said optical path, said optical path includes a lens to cause said optical path to intersect a second fixed point, and said convergent point is one of said first and second fixed points.

12. An autostereoscopic image recorder according to claim 11 including means for adjusting said convergent point by moving said lens and said first point relative to each other.

13. An autostereoscopic image recorder comprising:
a single recording means for recording images and including a single optical path through a convergent point between a scene and said recording means; path means for defining a scanning path transverse to said optical path; support means;
first and second mass means movably mounted to said support means and said first mass means being connected to said recording means; and
drive means for substantially continuously moving said first and second mass means in opposite directions and for substantially continuously moving said recording means along said scanning path for a plurality of scanning cycles.

14. An autostereoscopic image recorder according to claim 13 wherein said second mass means has substantially the mass of said first mass means plus the mass of said recording means.

15. An autostereoscopic image recorder according to claim 13 wherein said drive means includes an armature and a stator mounted to said first and second mass means.

16. An autostereoscopic image recorder according to claim 13 wherein said first and second mass means are connected to said support by pulleys.

17. An autostereoscopic image recorder comprising:
a single recording means for recording images and including a single optical path through a convergent point between a scene and said recording means;
path means for defining a scanning path transverse to said optical path;
driving means for substantially continuously moving said recording means along said scanning path for a plurality of scanning cycles; and
adjustment means for determining the distance between said recording means and a desired convergent point and adjusting said path means to maintain said optical path on said desired convergent point during scanning.

18. An autostereoscopic image recorder comprising:
a single recording means for recording images and including a single optical path through a convergent point between a scene and said recording means;
path means for defining a scanning path transverse to said optical path;
driving means for substantially continuously moving said recording means along said scanning path for a plurality of scanning cycles; and
adjustment means for determining degree of motion of images being recorded and adjusting the travel along said scanning path as a function of determined degree of motion.

19. An autostereoscopic image recorder according to claim 18 wherein said adjustment means increases the amount of travel for increased degree of motion.

20. An autostereoscopic image recorder according to claim 18 wherein said adjustment means includes correlation means for correlating successive recorded images to determine degree of motion.

21. An autostereoscopic image recorder comprising:
a single recording means for recording images and including a single optical path through a convergent point between a scene and said recording means;
path means for defining a scanning path transverse to said optical path;
driving means for substantially continuously moving said recording means along said scanning path for a plurality of scanning cycles; and
synchronization means for synchronizing said driving means to image recording of said recording means.

22. An autostereoscopic image recorder according to claim 21 wherein said synchronization means controls said driving means for bidirectional operation of said recording means.

23. An autostereoscopic image recorder comprising:
a single recording means for recording images and including a single optical path through a convergent point between a scene and said recording means;
path means for defining a scanning path transverse to said optical path;
driving means for substantially continuously moving said recording means along said scanning path for a plurality of scanning cycles; and
adjustment means for adjusting recorded images as a function of position of said recording means on said scanning path.

24. An autostereoscopic image recorder according to claim 23 wherein said adjustment means adjusts the position of a recorded image during displaying.

25. An autostereoscopic image recorder according to claim 23 wherein said adjustment means adjusts the position of an image on a recording medium during recording.

* * * * *